United States Patent
Gan (10) Patent No.: US 10,427,789 B2
(45) Date of Patent: Oct. 1, 2019

(54) UNMANNED AERIAL VEHICLE USED IN FISHING

(71) Applicant: NINGBO PELICAN DRONE CO., LTD., Ningbo (CN)

(72) Inventor: Tao Gan, Melbourne (AU)

( * ) Notice: Subject to any disclaimer, the term of this patent is extended or adjusted under 35 U.S.C. 154(b) by 227 days.

(21) Appl. No.: 15/644,794

(22) Filed: Jul. 9, 2017

(65) Prior Publication Data

US 2018/0370632 A1 Dec. 27, 2018

(30) Foreign Application Priority Data

Jun. 21, 2017 (CN) .......................... 2017 1 0477043

(51) Int. Cl.

| | | |
|---|---|---|
| B64C 39/02 | (2006.01) | |
| B64D 1/22 | (2006.01) | |
| A01K 79/00 | (2006.01) | |
| A01K 91/02 | (2006.01) | |
| A01K 97/02 | (2006.01) | |
| B64D 1/00 | (2006.01) | |
| G05D 1/00 | (2006.01) | |
| A01K 83/00 | (2006.01) | |
| A01K 93/00 | (2006.01) | |
| A01K 97/12 | (2006.01) | |
| A01K 99/00 | (2006.01) | |
| G01S 15/96 | (2006.01) | |

(52) U.S. Cl.
CPC ............... B64D 1/22 (2013.01); A01K 79/00 (2013.01); A01K 83/00 (2013.01); A01K 91/02 (2013.01); A01K 93/00 (2013.01); A01K 97/02 (2013.01); A01K 97/125 (2013.01); A01K 99/00 (2013.01); B64C 39/024 (2013.01); B64D 1/00 (2013.01); G01S 15/96 (2013.01); G05D 1/0094 (2013.01); *B64C 2201/12* (2013.01)

(58) Field of Classification Search
CPC ............ B64D 1/00; B64D 1/22; B64C 39/024
See application file for complete search history.

(56) References Cited

U.S. PATENT DOCUMENTS

| | | | | |
|---|---|---|---|---|
| 1,735,385 A | * | 11/1929 | Fisher ...................... | B64D 1/22 119/426 |
| 3,804,371 A | * | 4/1974 | Mills ........................ | B64D 1/22 254/336 |
| 4,379,534 A | * | 4/1983 | Miller ...................... | B64D 1/22 102/354 |
| 5,143,326 A | * | 9/1992 | Parks ....................... | B64D 1/22 244/118.1 |
| 5,826,825 A | * | 10/1998 | Gabriel .................... | B64D 1/22 244/137.1 |

(Continued)

*Primary Examiner* — Colleen M Chavchavadze
(74) *Attorney, Agent, or Firm* — W&K IP (57) ABSTRACT

The present disclosure discloses an unmanned aerial vehicle (UAV), comprising a housing having a top part and a bottom part, a plurality of arms arranged on the top part, each arm having a motor and an airscrew, a battery unit arranged within the housing, a processor arranged within the housing, a sonar unit having a wire connected thereto, and a positioning unit detachably mounted within a mounting groove recessed from the bottom part, wherein the positioning unit is connected to the wire and configured to retract or release the wire. An UAV readily configured for fishing can be provided by embodiments of the present disclosure.

6 Claims, 10 Drawing Sheets

(56) References Cited

U.S. PATENT DOCUMENTS

| | | | |
|---|---|---|---|
| 8,370,003 B2* | 2/2013 | So | B64C 39/024 |
| | | | 701/3 |
| 9,043,052 B2* | 5/2015 | So | G01C 23/00 |
| | | | 701/3 |
| 9,346,547 B2* | 5/2016 | Patrick | B64C 39/024 |
| 9,676,481 B1* | 6/2017 | Buchmueller | B64D 1/12 |
| 9,879,986 B2* | 1/2018 | Carlson | G01B 11/26 |
| 9,994,333 B2* | 6/2018 | Kube | H02J 50/10 |
| 10,071,804 B1* | 9/2018 | Buchmueller | B64C 39/024 |
| 2009/0146010 A1* | 6/2009 | Cohen | G05D 1/0858 |
| | | | 244/137.1 |
| 2016/0059963 A1* | 3/2016 | Burgess | B64D 1/12 |
| | | | 701/49 |
| 2017/0073071 A1* | 3/2017 | Salzmann | B64D 1/22 |
| 2017/0139409 A1* | 5/2017 | Clarke | B64C 39/024 |
| 2017/0267347 A1* | 9/2017 | Rinaldi | B64D 1/22 |
| 2017/0280678 A1* | 10/2017 | Jones | A01K 5/0291 |
| 2017/0327220 A1* | 11/2017 | Hu | B64C 39/024 |
| 2017/0329351 A1* | 11/2017 | Park | A01B 79/005 |
| 2018/0107210 A1* | 4/2018 | Harnett | G05D 1/0038 |
| 2018/0244391 A1* | 8/2018 | Curran | B64C 39/024 |
| 2018/0373241 A1* | 12/2018 | Gan | A01K 83/00 |
| 2019/0100413 A1* | 4/2019 | Roedts, II | B66C 13/06 |
| 2019/0102730 A1* | 4/2019 | Giorgi | G06Q 10/0832 |

\* cited by examiner

Flying the UAV to a designated destination

Adjusting the sonar unit to a predetermined height

Using the sonar unit to detect signals and determine a fishing region

Using the launching unit to launch bait to the fishing region

Using the fishhook unit to release a fishhook to the fishing region

Manipulating the UAV to hover or return

UNMANNED AERIAL VEHICLE USED IN FISHING

CROSS-REFERENCE TO RELATED APPLICATIONS

This application claims priority to Chinese Patent Application No. 201710477043.2 with a filing date of Jun. 21, 2017. The content of the aforementioned application, including any intervening amendments thereto, are incorporated herein by reference.

TECHNICAL FIELD

The present disclosure relates to an unmanned aerial vehicle (UAV), and more particularly, to an UAV used in fishing.

BACKGROUND

Identifying locations of fish in seas, rivers or lakes may prove difficult for a fishing participator. The fishing participator would be less efficient if he or she fails to fish in a location where large flocks of fish tend to gather. In particular, it is also difficult to deploy a fishhook to a designated destination oversea due to a large fishing area of choice.

SUMMARY

The present disclosure discloses an unmanned aerial vehicle (UAV) used in fishing, comprising a housing, said housing having a top part and a bottom part, a plurality of arms arranged on the top part, each arm having a motor and an airscrew, a battery unit arranged within the housing, a processor arranged within the housing, a sonar unit having a wire connected thereto, and a positioning unit detachably mounted within a mounting groove recessed from the bottom part, wherein the positioning unit is connected to the wire and configured to retract or release the wire.

In some embodiments, the positioning unit comprises a rotator to engage the wire and a power component to actuate the rotator.

In some embodiments, the positioning unit comprises a supporting component to support the wire, and a first sensor to sense the force between the wire and the supporting component, and wherein the processor is configured to instruct the power component to stop or decelerate in response to the first sensor sending a signal to the processor indicating the sensed force is less than a first predetermined threshold.

In some embodiments, the first sensor comprises a first microswitch in contact with the supporting component, and wherein the processor is configured to instruct the power component to stop or decelerate in response to the first microswitch sending a signal to the processor indicating a displacement of the supporting component caused by a change in the force between the wire and the supporting component.

In some embodiments, the supporting component is hinged within the positioning unit, and wherein the processor is configured to instruct the power component to stop or decelerate in response to the first microswitch switching off due to a rotation of the supporting component caused by a change in the force between the wire and the supporting component.

In some embodiments, the housing comprises a second sensor to detect the distance between the sonar unit and the housing, and wherein the processor is configured to instruct the power component to stop in response to the second sensor sending a signal to the processor indicating a detected distance between the sonar unit and the housing is less than a second predetermined threshold.

In some embodiments, the second sensor comprises a second microswitch arranged on the housing, and wherein the processor is configured to instruct the power component to stop in response to the second microswitch sending a signal to the processor indicating a contact of the second microswitch with the sonar unit.

In some embodiments, the power component comprises a driving shaft on one end, the positioning unit comprises a fixing shell and a back shell covering the power component, the rotator is arranged on the back shell and engages with the driving shaft, and the fixing shell is connected to the back shell to form a first cavity to contain the power component.

In some embodiments, the positioning unit comprises a front shell which is connected with a rim of the back shell to form a second cavity to contain the rotator, and wherein the rim extends from a side of the back shell away from the driving shaft and engages with an end region of the rotator.

In some embodiments, the front shell comprises a linking component in connection with the rim and a lid detachably connected to the linking component.

Embodiments of the present disclosure alleviate at least some of the problems of prior arts by providing a more effective UAV in situations of fishing.

BRIEF DESCRIPTION OF THE DRAWINGS

The present disclosure is illustrated by way of example and not limitation in the figures of the accompanying drawing, in which.

REFERENCE NUMBERS 1, housing; 11 mounting groove; 2, sonar unit; 3, fishhook unit; 4, launching unit; 5, positioning unit; 51, fixing shell; 52, power component; 53, back shell; 54, roller; 55, linking component; 56, lid; 57, supporting plate; 58, first microswitch; 59, second microswitch; 6, slide bar; 7, supporting component; 8, sliding groove.

DETAILED DESCRIPTION

Various aspects of the illustrative embodiments of the present disclosure will be described herein using terms commonly employed by those skilled in the art. However, it will be apparent to those skilled in the art that alternate embodiments may be practiced with only some of the described aspects. For purposes of explanation, specific numbers, materials and configurations are set forth in order to provide a thorough understanding of the illustrative embodiments. It will be apparent that alternate embodiments may be practiced without the specific details. In other instances, well-known features are omitted or simplified in order not to obscure the illustrative embodiments.

It will be understood that, although the terms first, second, third, etc. may be used herein to describe various elements, these elements should not be limited by these terms to indicate or imply any relative importance. These terms are only used to distinguish one element from another. For example, a first element could be termed a second element without departing from the scope of the present disclosure. The terms center, upper, lower, left, right, vertical, lateral, inner, outer, etc., may indicate directions or positions as illustrated in some of the drawings. These terms are only used in order not to obscure the description, and should not be construed as an indication of particular positional relation or sequence. As used herein, the term and/or includes any and all combinations of one or more of the associated listed items. The terms connected, coupled or any variant thereof means any connection or coupling either direct or indirect between two or more elements. Such a coupling or connection between the elements can be physical, electrical, logical or a combination thereof.

Figure 1:
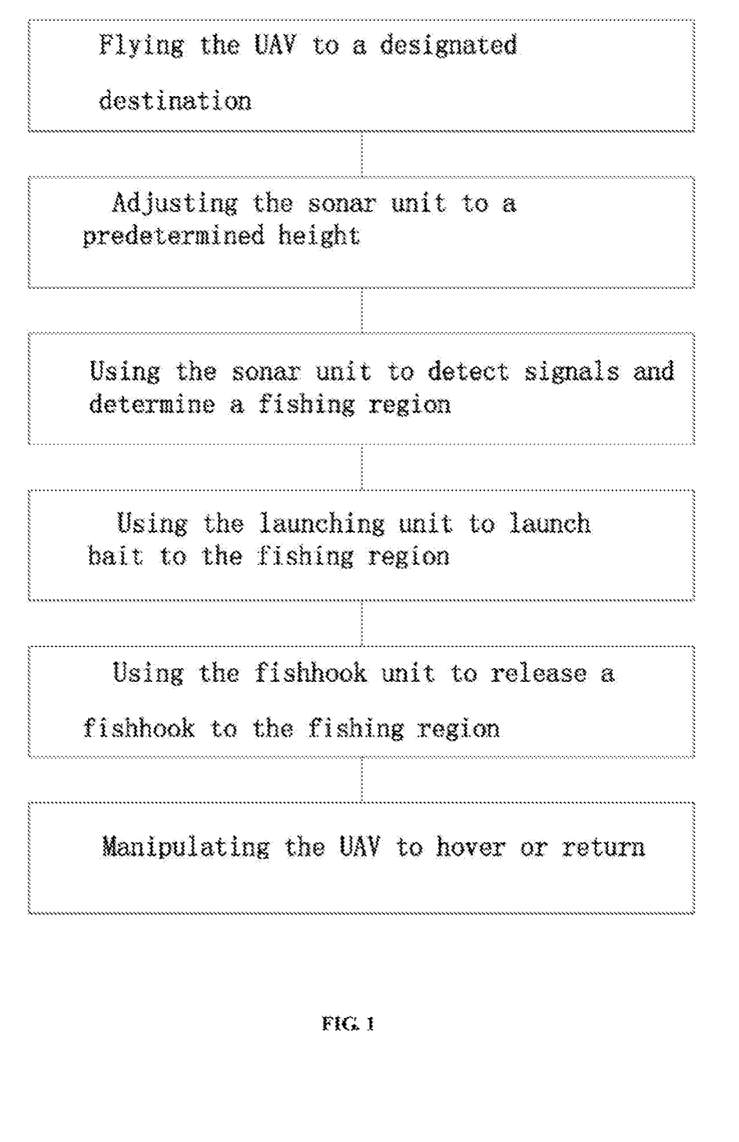
FIG. 1 illustrates a flowchart of a method of using an UAV to fish according to an embodiment of the present disclosure.

FIG. 1 illustrates a flow chart of method steps according to embodiments implementing an UAV in fishing. A processor of the UAV controls the UAV to fly to any designated destination based on instructions received or preset program. The designated destination may be an actual geographical area or location determined by a manual user or a preset program. For example, the designated destination may be an area of 10 m*10 m determined by GPS signal, or a specific geographical spot reached through multiple flying instructions. In an embodiment, the designated destination is determined before guiding the UAV with GPS navigation thereto. In an embodiment, an operator of the UAV sends the UAV to a destination he or she prefers by providing a series of manual flying instructions.

The positioning unit 5 adjusts the height of the sonar unit to a predetermined height by raising or lowering the sonar unit. In an embodiment, the sonar unit is mounted on positioning unit 5. The positioning unit 5 releases the sonar unit from the UAV before fishing and retracts the sonar unit from water surface after fishing by using a wire. The predetermined height can be 8-10 m deep underwater. In an embodiment, the sonar unit reaches the predetermined height using feedback from a distance sensor. In an embodiment, an operator of the UAV provides manual lifting or diving instructions to the positioning unit 5 in real time until the sonar unit reaches the predetermined height. Further, the sonar unit can comprise a floater which floats above water surface and a sonar main body. The floater is connected with the sonar main body by a linking component 55 comprising a non-extendable rope or multiple connected segments of flexible rope. Assuming the predetermined height is 8-10 m deep underwater, the length of the linking component 55 can be configured 8-10 m. In an embodiment where the linking component 55 is 9 m long, the sonar main body would stay at the predetermined height of 9 m underwater while the floater remains on water surface. In an embodiment, real-time image of the floater on water surface can be provided as a feedback. In an embodiment, a force sensor is provided between the positioning unit 5 and the sonar unit to detect the tension on the wire which connects the sonar unit to the positioning unit 5. If the force sensor senses the tension associated with releasing and retracting of the sonar unit is less than a predetermined threshold, the floater is estimated to be floating on water surface and the sonar unit is estimated to have reached the predetermined height.

The sonar unit sends multiple signals to the processor about its ambient objects. The coordinates near the sonar unit will be determined as a fishing region if the signals are consistent with predetermined information regarding characteristics of presence of fish. For example, potential targets at multiple coordinates are compared in aspects such as the number and size thereof. The coordinates where preferred results are detected are chosen as the fishing region. The fishing region can also be determined by comparing detected results with preset values or thresholds.

After the fishing region is determined, a fishhook on the fishhook unit 3 is released to the fishing region without a need to do so manually. This one-step approach would improve accuracy of the deployment of the fishhook in the fishing region. Real-time images of the fishhook in water can be provided as a feedback. It is also possible to provide a force sensor which senses the tension between the fishhook and the fishhook unit 3. The fishhook is estimated to have been under water if the tension between the fishhook and the fishhook unit 3 becomes less than a predetermined threshold.

Since the sonar unit can detect potential targets in a designated destination after it reaches the predetermined height, a favorable fishing region with the most targets can be determined by comparing detected signals. Deploying bait in the specific fishing region can further enhance the number and activity level of potential targets within. Thereby more efficient fishing can be achieved.

The bait and/or fishhook can be attached to the UAV in various ways. In one embodiment, the bait and the fishhook are hung to the launching unit 4 and the fishhook unit 3 respectively before the UAV flies to the designated destination. Therefore, the UAV would not need to return during fishing. The actions of launching the bait and releasing the fishhook can be performed faster. In one embodiment, the bait is hung to the launching unit 4 before the UAV flies to the designated destination. The fishhook is hung to the fishhook unit 3 after the UAV return from deploying of the bait. Since there is no need to retrieve the bait, the bait can be carried by the UAV before any detection is performed and launched as soon as the fishing region is determined. Efficiency of bait deploying can be improved using this approach. The fish wire connecting the fishhook could get caught on obstacles when the UAV travels to various destinations, resulting in difficulty in retrieving the fish wire or the fishhook. To reduce the probability of such occasions, having the UAV return to retrieve the fishhook after determining the fishing region will help. In an embodiment, the UAV returns with the fishhook fixing to the fishhook unit 3 after the coordinates corresponding to signals detected by the sonar unit are determined as the fishing region. Reducing the weight of load carried by the UAV during sonar detection reduces energy cost. This will extend the performance time of the UAV especially when a long time is spent over detecting too many coordinates.

After the fishhook unit 3 releases the fishhook to the fishing area, the positioning unit 5 maintains the sonar unit at the predetermined height. The sonar unit 2 performs detecting and sends the detected signals to the processor of the UAV at a predetermined interval. That is to say, the sonar unit 2 continuously detects its ambient objects during fishing and estimates the change of potential targets. The estimated change of potential targets is used to determine whether a new fishing region should be selected. Further, a series of thresholds can be prepared. For example, the UAV can move to other coordinates near the fishing region if the detected signal falls below a certain threshold. Upon comparing signals detected from these coordinates with the signal detected in the original fishing region, the processor determines whether or not it is necessary to move to other coordinates. If the detected signal falls below a minimal threshold, the processor manipulates the UAV to fly to a new designated destination according to one of a received wireless communication and a preset program so that a new instance of fishing can start.

The UAV also comprises a camera which sends images collected to the processor in real time. The processor can transmit the images to a remote user using a remote controller or user terminal. Fishing efficiency is improved by transmitting real-time images of the sonar unit and the fishhook as a feedback. The user can also be allowed to manipulate the UAV manually based on the received images and therefore participate in the whole fishing instance. In other words, the UAV may hover or return according to either received wireless communication or a preset program.

Figure 2:
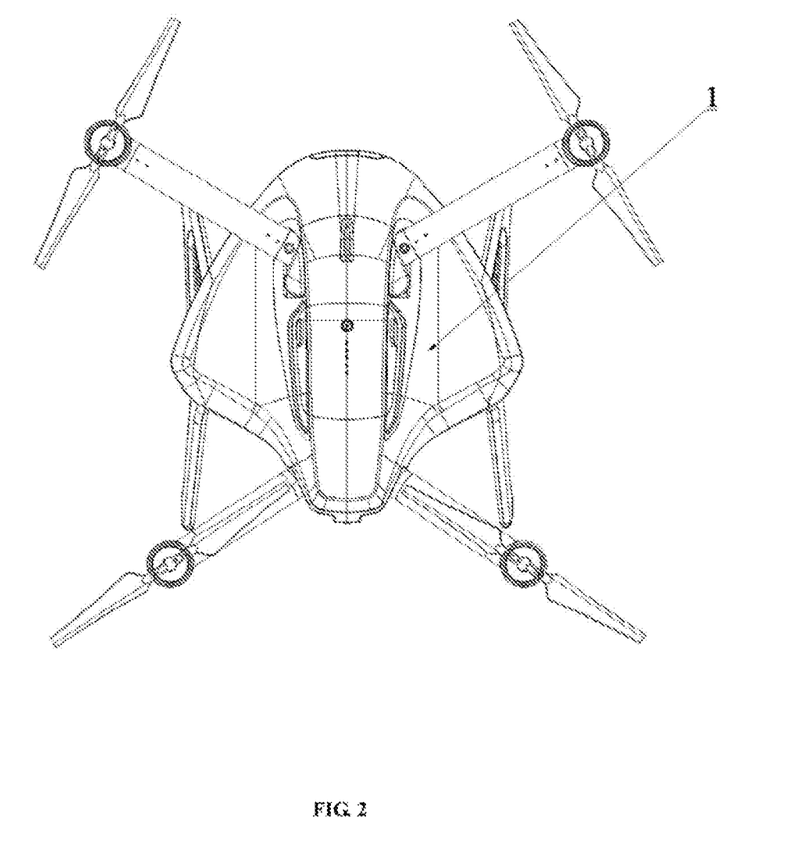
FIG. 2 illustrates a top view of an UAV according to an embodiment of the present disclosure.
Figure 3:
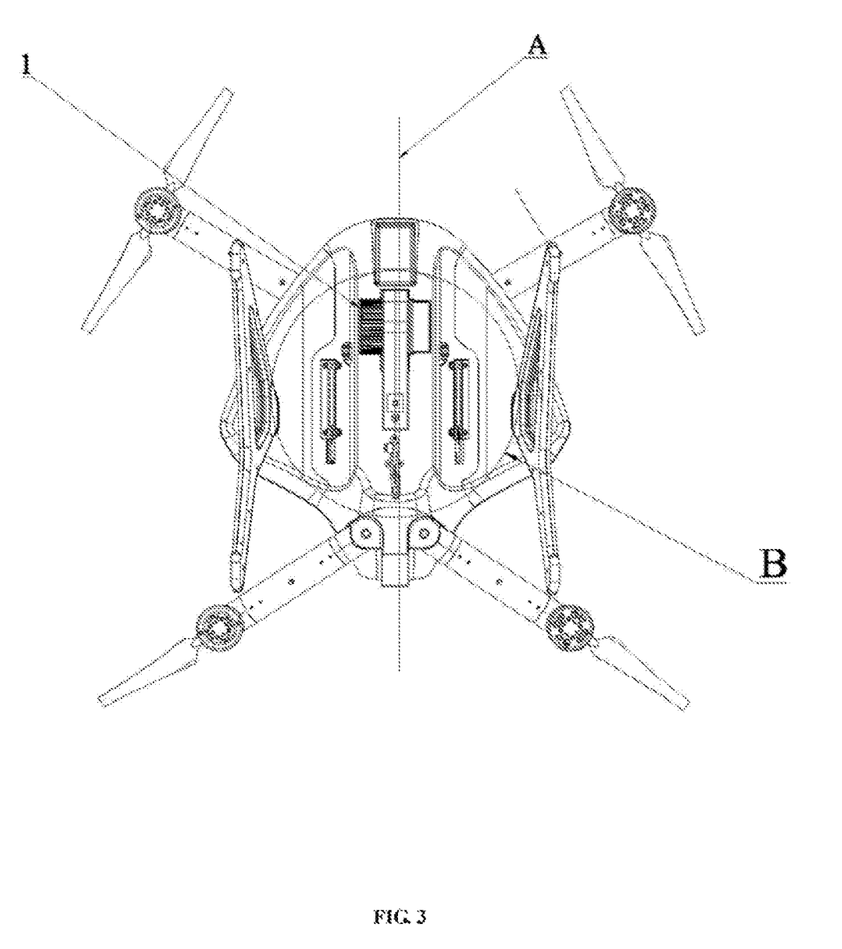
FIG. 3 illustrates a bottom view of an UAV according to an embodiment of the present disclosure.
Figure 4:
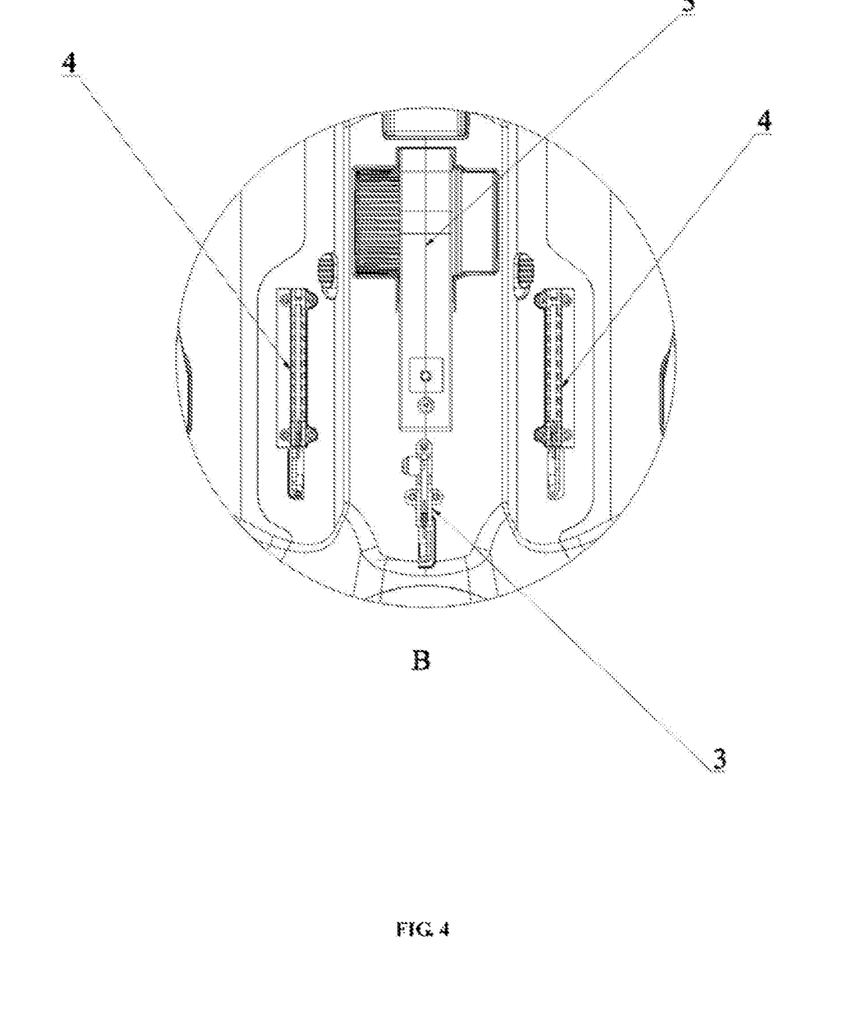
FIG. 4 illustrates an enlarged view of the part A in FIG. 3.

As shown in FIG. 2-4, the UAV in which the above discussed method is performed comprises a housing 1, a processor, a positioning unit 5, a sonar unit 2, a launching unit 4, a fishhook unit 3 and a battery unit. The housing 1 comprises a top part, and a bottom part. A plurality of arms are rotatably connected to the top part of the housing 1. Each arm is equipped with a motor and an airscrew. The processor is located within the housing 1 and is configured to control the positioning unit 5, the sonar unit 2, the launching unit 4, the fishhook unit 3 and the flight of the UAV. The processor is also configured to control the receiving and transmitting of wireless signals.

The positioning unit 5 and the fishhook unit 3 are arranged on the bottom part of the housing along the line "A" which is the axis of symmetry. A via provided on the positioning unit 5 as an entrance for any connecting components is also located on the axis of symmetry. The position on the axis of symmetry allows the force induced by the positioning unit 5 and the fishhook unit 3 to the housing 1 to be distributed uniformly. The size of the fishhook unit 3 is designed small to facilitate deployment of the fishhook. In other embodiments, the fishhook unit 3 is arranged on the border of the housing 1 or an undercarriage to avoid any influence to the deployment of the fishhook. More than one fishhook can be provided on the fishhook unit 3. More than one fishhook unit 3 can be provided on the bottom part of housing 1.

The launching unit 4 comprises a plurality of identical single bodies. The single bodies are distributed uniformly on the bottom part of housing 1. In some embodiments, the number of single bodies can be 2, 4 or 8. Each single body comprises a left part and a right part separated by the axis of symmetry "A". The symmetric configuration improves stability of the UAV since the force applied to the UAV by each launching unit 4 would also be symmetric. Bait for fish can be stored in a storage component hung on the launching unit 4. The storage components are correspondingly arranged on respective hanging areas. The positioning unit 5, sonar unit 2, launching unit 4 and the fishhook unit 3 are arranged on the bottom part of housing 1 altogether in an effort to maintain a balance of weight.

Figure 5:
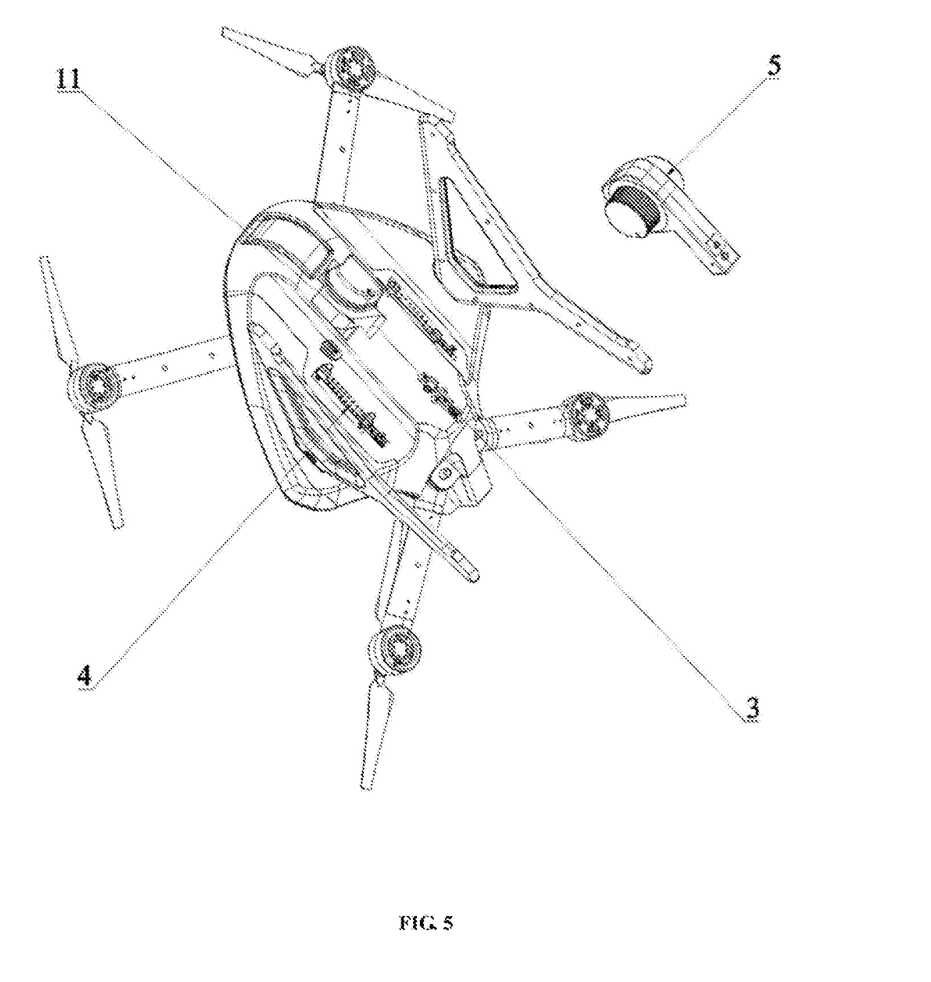
FIG. 5 illustrates an exploded view of an UAV according to an embodiment of the present disclosure.
Figure 10:
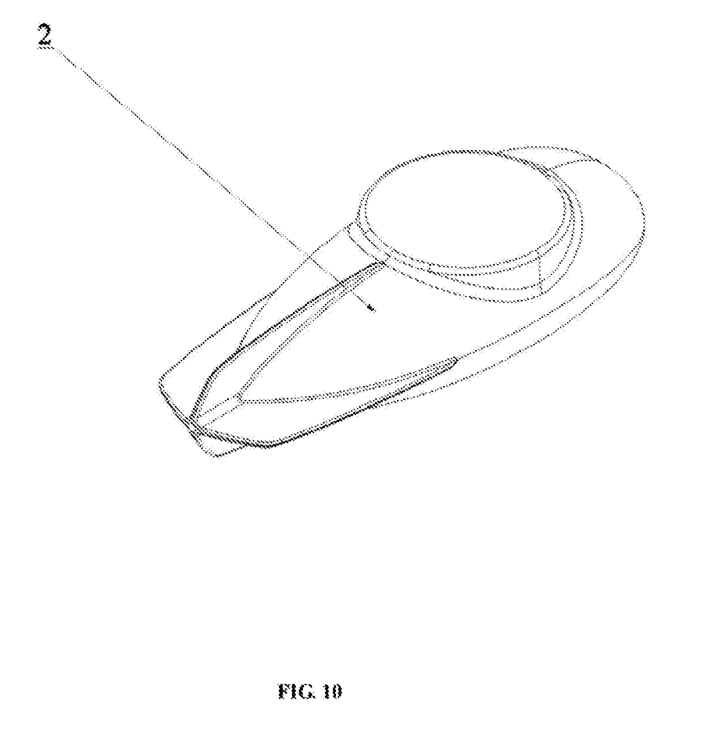
FIG. 10 illustrates a sonar unit of an UAV according to an embodiment of the present disclosure.

As shown in FIGS. 5 and 10, the bottom part of the housing 1 comprises amounting groove 11 formed by an inward depression on the outer wall. The positioning unit 5 is connected to a wire which is also connected to the sonar unit 2. The positioning unit 5 is configured to retract and/or release the wire. Therefore, the positioning unit 5 is mounted outside the housing 1 instead of inside. The positioning unit 5 is detachably mounted in the mounting groove, so that it could be mounted or removed without taking the housing 1 apart. If the wire in the positioning unit 5 get intertwined, repair or replacement of the positioning unit 5 would become necessary. The detachable configuration also facilitates quicker repair or replacement of the positioning unit 5. A fixing block is provided in the mounting groove. A fixing slit is formed on the outer wall of the positioning unit 5 to engage with the fixing block. The detachable configuration is achieved by the fixing block and the fixing slit. In other embodiments, the detachable configuration is achieved by elastic buckles.

Figure 6:
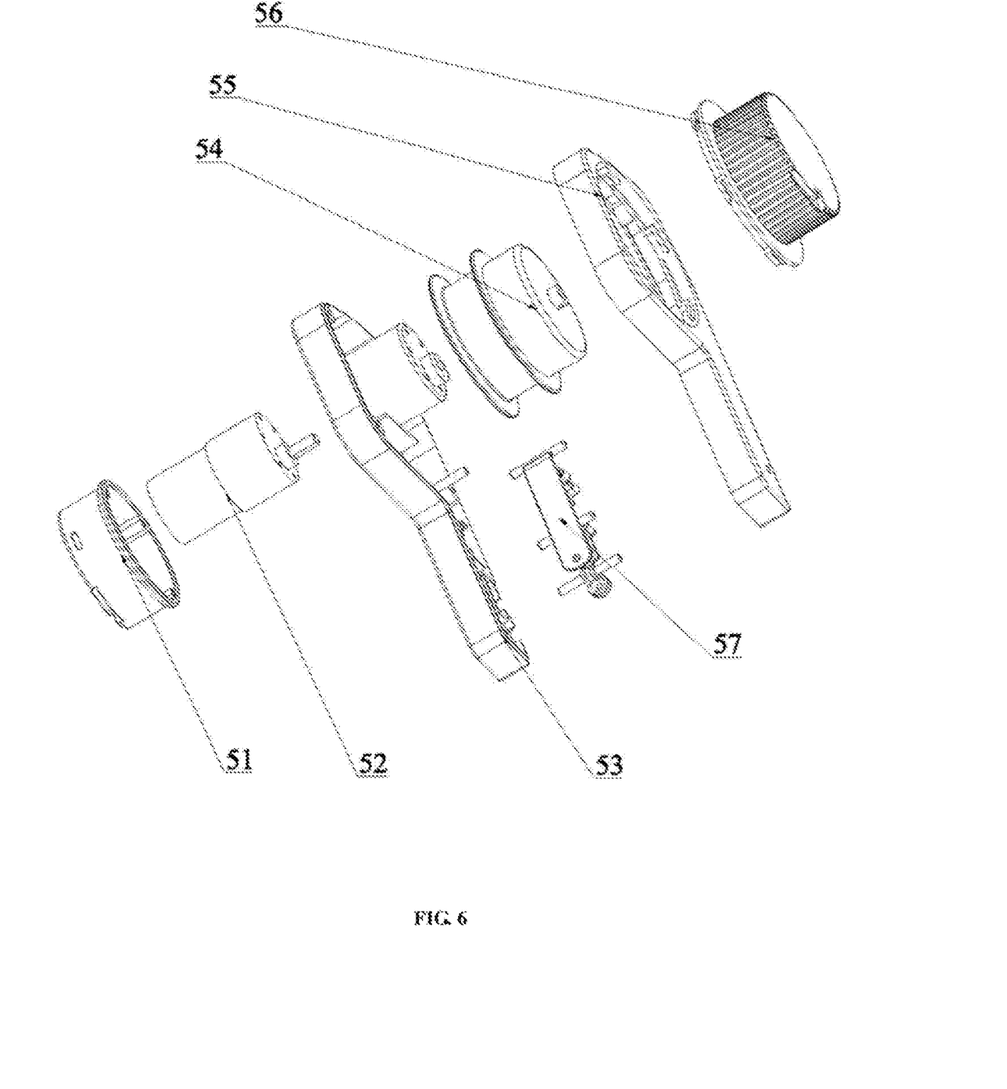
FIG. 6 illustrates an exploded view of positioning unit of an UAV according to an embodiment of the present disclosure.

As shown in FIG. 6, the positioning unit 5 further comprises a rotator to engage the wire and a power component 52 to drive the rotator. The power component 52 comprises a driving shaft on one of its ends. The positioning unit 5 further comprises a fixing shell 51 and a back shell 53 covering the power component 52. The rotator is arranged outside the back shell 53 and drivably connected to the driving shaft. The fixing shell 51 and the back shell 53 form a cavity to contain the power component 52. Assembly of the rotator, the back shell 53 and the power component 52 in such a fashion reduces the total installing space required. A rim which engages with the end region of the rotator extends from the side of the back shell 53 away from the driving shaft. A front shell is connected to the back shell 53 by that rim. The back shell 53 and the front shell thus form another cavity to contain the rotator. Placing the power component 52 and the rotator in different cavities can avoid interference between the two. Influence to the power component 52 by the wire can also be avoided. The front shell comprises a linking component 55 in connection with the rim and a lid 56 detachably connected to the linking component 55. Resolving the front shell into a linking component 55 and a lid 56 facilitates repair because the rotator can be accessed by simply removing the lid 56. Sealing rings are provided between the fixing shell and the back shell 53, as well as between the back shell 53 and the driving shaft, to provide leakproofness.

Figure 7:
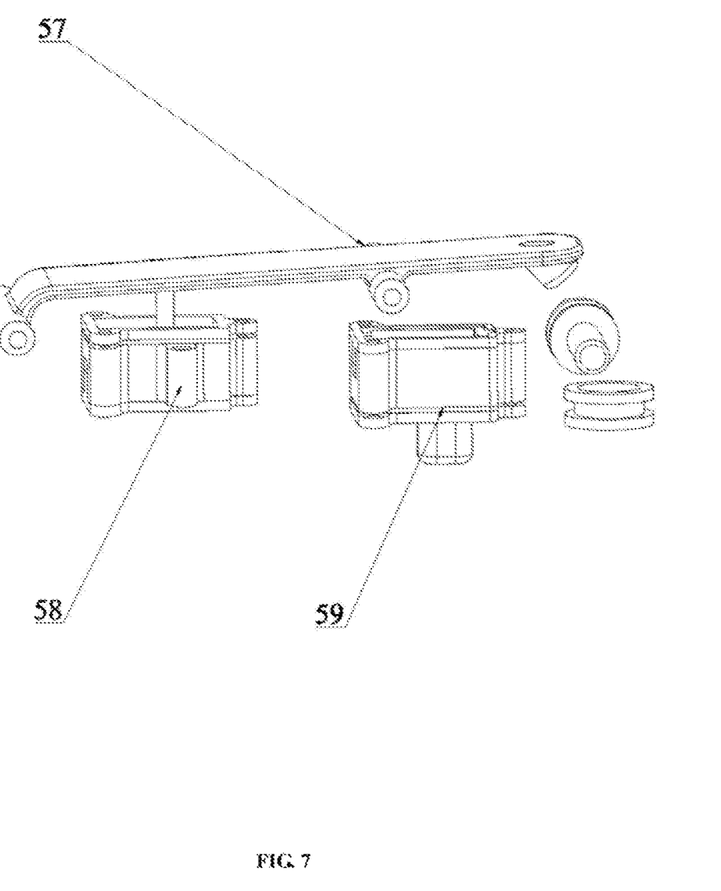
FIG. 7 illustrates part of a positioning unit of an UAV according to an embodiment of the present disclosure.

As shown in FIG. 7, the positioning unit 5 further comprises a supporting plate 57 to support the wire. A via is opened on the supporting plate 57 to allow the wire to travel through. Displacement of the wire results in a force applied to the supporting plate 67 which keeps the supporting plate 57 in position. However, the tension between the supporting plate 57 and the wire would change due to winds or inertia, leaving the wire in a loosened state. The wire could get twined with itself. Movement of the wire can be severely influenced if this happens. In an embodiment, displacement of the supporting plate 57 resulting from the tension between the supporting plate 57 and the wire becoming less than a predetermined threshold would trigger the first microswitch 58. The triggering of first microswitch 58 would send a signal to the processor. The processor then instructs the power component 52 to stop retracting or to decelerate until the wire is tightened again. In an embodiment, a force sensor can be arranged on the direction of the displacement of the supporting plate 57 to detect the tension between the supporting plate 57 and the wire. The processor instructs the power component 52 to stop retracting or to decelerate if the tension detected by the force sensor has become less than a predetermined threshold.

The supporting plate 57 can be arranged horizontally. Since the sonar unit ascends or descends in the vertical direction, the force induced by the wire can be applied perpendicularly to the supporting plate 57 in order to achieve more accurate signals. The supporting plate can be a plate hinged on one side, while the via which engages with the wire can be arranged on the other side. In an embodiment, the positioning unit 5 comprises a distance sensor which senses the distance between the sonar unit 2 and the housing 1. To ensure the accuracy of the detection of distance, the distance sensor can be provided on the housing 1 alternatively. If the distance between the sonar unit 2 and the housing 1 falls below a predetermined threshold, the processor instructs the power component 52 to stop operation and return the sonar unit 2 from water surface back to the positioning unit 5. In some embodiments, the distance sensor can be a second microswitch. The second microswitch is triggered when it contacts the risen sonar unit 2. The processor instructs the power component 52 to stop operation in response to the trigger of the second microswitch.

Figure 8:
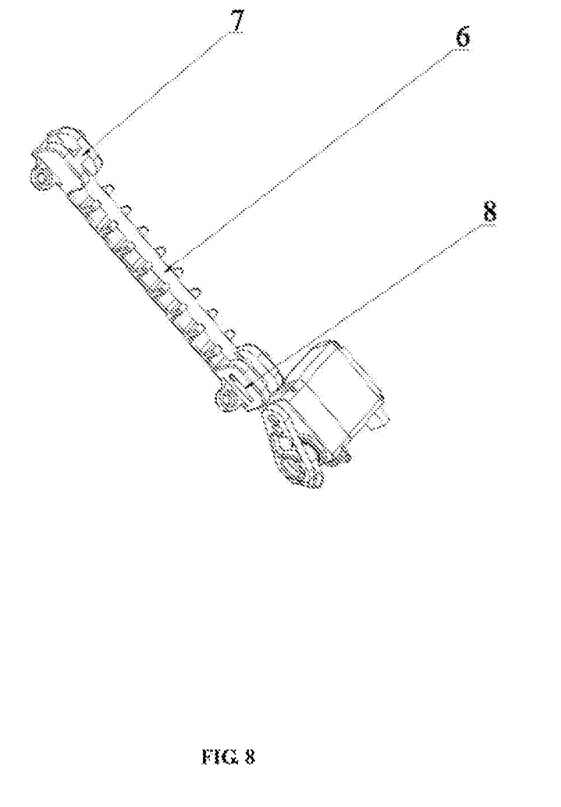
FIG. 8 illustrates a launching unit of an UAV according to an embodiment of the present disclosure.
Figure 9:
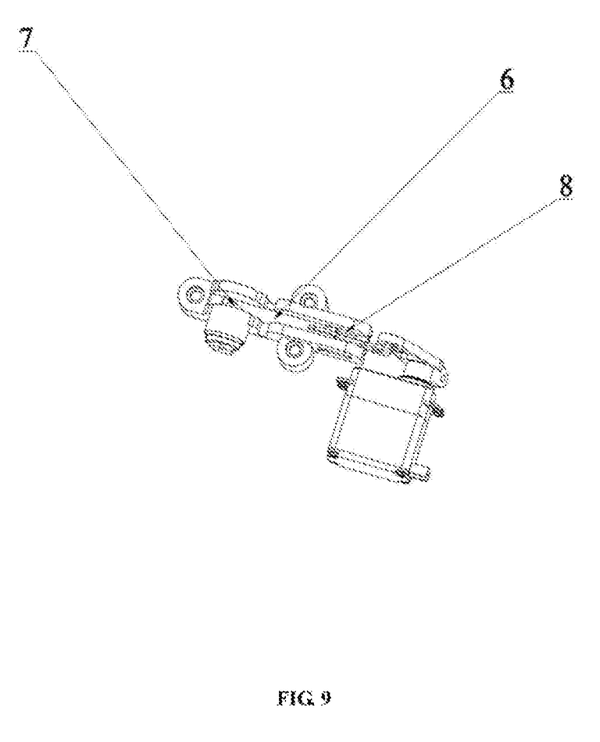
FIG. 9 illustrates a fishhook unit of an UAV according to an embodiment of the present disclosure.

As shown in FIGS. 8 and 9, each of the launching unit 4 and the fishhook unit 5 comprises a slide bar 6 and a driving component to actuate the slide bar 6. The driving component drives the slide bar into a displacement based on instructions received from the processor. The displacement of the slide bar 6 causes the bait or the fishhook to be released to the fishing region. In some embodiments, the driving component can be the power component 52. Alternatively, a first sliding groove 8 can be provided on the bottom part of the housing 1. A pivot, which is connected to one end of the slide bar 6, is slidably connected in the first sliding groove 8. The driving component drives the pivot to slide within the first sliding groove 8 and therefore causes the displacement of the slide bar 6. The displacement of the slide bar 6 eventually causes the slide bar 6 to detach from the supporting component 7. The slide bar 6 rotates about the pivot to provide space for a dropping movement of the bait or the fishhook. The driving component comprises a linking shaft, a motor and a swing arm fixed to a driving shaft of the motor. The two ends of the linking shaft are drivably connected to the swing arm and the driving shaft of the motor respectively. In an embodiment, a crank link structure is formed by the linking shaft, the motor and the swing arm. The crank link structure provides stable functioning and allows a relatively large displacement for the slide bar 6 when space is limited.

In an embodiment, the bottom part of the housing 1 comprises a second sliding groove in which the supporting component 7 is slidably connected. The driving component actuates the supporting component 7 to slide within the supporting component 7. The slide bar 6 is detached from the supporting component 7 on the movement of the supporting component 7. In other words, the slide bar 6 is driven to rotate around its pivot by moving the supporting component 7. In comparison to actuating the slide bar 6 alone, actuating the supporting component 7 could be performed in more directions without considering interference of the movement direction of the slide bar 6 to its pivot.

In an embodiment, the supporting component is rotatably connected to the bottom part of the housing 1. The driving component actuates the supporting component 7 to rotate and detach itself from the slide bar 6. In other words, the slide bar 6 is actuated to rotate around its pivot by rotating the supporting component 7. Rotating the supporting component instead further reduces the occupied space needed.

As shown in FIG. 8, a baffle is disposed on the bottom part of the housing 1. A plurality of finlets are provided on the baffle. Each finlet has a cut which engages with the slide bar 6. A through-hole is formed by adjacent finlets and the slide bar 6. Bait can be placed within a storage component which is fixed by the through-holes such that the launching unit 4 may launch the bait stably.

In an embodiment, the launching unit comprises a pedestal which is fixed to bottom part of the housing 1. A first bump and a second bump are arranged on the two sides of the pedestal, respectively. The first sliding groove 8 is arranged on the first bump. The supporting component 7 is arranged on the second bump. The motor is fixed to the inner wall of the bottom part of the housing 1. A via for the swing arm to pass through is provided on the bottom part of the housing 1. In other words, the first bump, the slide bar 6, the second bump and the driving component are arranged in alignment to reduce the total occupied space. Similarly, the finlets can be provided on the pedestal.

As shown in FIG. 9, the UAV may have difficulties in dragging any captured target if an obstacle impedes the course due to external environments. For example, the fish wire may be twined around an external obstacle when the UAV drags the fishhook to the fishing area, especially when the length of the fish wire is relatively long. In order to secure the retrieving of the UAV, the supporting component is designed to be slidably connected to the housing 1 along a direction perpendicular to the slide bar 6. A round corner in contact with the slide bar 6 is provided on the supporting component 7. An elastic component is provided between the supporting component 7 and the housing 1. By using such a configuration, traction resistance force would be applied to the elastic component of the supporting component 7 due to the round corner. If the traction resistance force becomes larger than a predetermined threshold, the elastic component will be pushed to a position in which the supporting component 7 is detached from the slide bar 6, and then the fishhook or bait would be separated from the slide bar 6 to ensure the UAV can be retrieved. In an embodiment, a force sensor can be provided on the supporting component 7. The force sensor detects the force applied to the slide bar 6. If the detected force is larger than a predetermined threshold, the processor of the UAV would instruct the driving component to separate the bait or fishhook from the slide bar 6. Alternatively, the processor can instruct the driving component to separate the bait or fishhook from the slide bar 6 based on the motor load of an arm of the UAV.

The supporting component 7 comprises a base fixed to the bottom part of the housing 1. An indentation is provided in the base which engages with the slide bar 6. The first sliding groove 8 and the supporting component 7 are arranged on the side walls of the indentation. The slide bar 6 is equipped with a fixing component to fix the fishhook. The slide bar 6 and a via provided on the base together fasten the fixing component in place to improve stability of the fishhook on the fishhook unit.

Although certain embodiments have been illustrated and described herein for purposes of description, a wide variety of alternate and/or equivalent embodiments or implementations calculated to achieve the same purposes may be substituted for the embodiments shown and described without departing from the scope of present disclosure. This application is intended to cover any adaptations or variations of the embodiments discussed herein. Therefore, it is manifestly intended that embodiments described herein be limited only by the claims and the equivalents thereof.

I claim:

1. An unmanned aerial vehicle (UAV) used in fishing, comprising:
   a housing, said housing having a top part and a bottom part;
   a plurality of arms arranged on the top part, each arm having a motor and an airscrew;
   a battery unit arranged within the housing;
   a processor arranged within the housing;
   a sonar unit having a wire connected thereto; and
   a positioning unit detachably mounted within a mounting groove recessed from the bottom part,
   wherein the positioning unit is connected to the wire and configured to retract or release the wire,
   wherein the positioning unit comprises a rotator to engage the wire and a power component to actuate the rotator,
   wherein the positioning unit further comprises a supporting component to support the wire, and a first sensor to sense the force between the wire and the supporting component,
   wherein the first sensor comprises a first microswitch in contact with the supporting component,
   wherein the supporting component is hinged within the positioning unit,
   and wherein the processor is configured to instruct the power component to stop or decelerate in response to the first sensor sending a signal to the processor indicating the sensed force is less than a first predetermined threshold, in response to the first microswitch sending a signal to the processor indicating a displacement of the supporting component caused by a change in the force between the wire and the supporting component, and in response to the first microswitch switching off due to a rotation of the supporting component caused by a change in the force between the wire and the supporting component.

2. The UAV of claim 1, wherein the housing comprises a second sensor to detect the distance between the sonar unit and the housing, and wherein the processor is configured to instruct the power component to stop in response to the second sensor sending, a signal to the processor indicating a detected distance between the sonar unit and the housing is less than a second predetermined threshold.

3. The UAV of claim 2, wherein the second sensor comprises a second microswitch arranged on the housing, and wherein the processor is configured to instruct the power component to stop in response to the second microswitch sending a signal to the processor indicating a contact of the second microswitch with the sonar unit.

4. An unmanned aerial vehicle (UAV) used in fishing, comprising:
   a housing, said housing having a top part and a bottom part;
   a plurality of arms arranged on the top part, each arm having a motor and an airscrew;
   a battery unit arranged within the housing;
   a processor arranged within the housing;
   a sonar unit having a wire connected thereto; and
   a positioning unit detachably mounted within a mounting groove recessed from the bottom part,
   wherein the positioning unit is connected to the wire and configured to retract or release the wire,
   wherein the positioning unit comprises a rotator to engage the wire and a power component to actuate the rotator,
   wherein the power component comprises a driving shaft on one end,
   wherein the positioning unit comprises a fixing shell and a back shell covering the power component,
   wherein the rotator is arranged on the back shell and engages with the driving shaft, and
   wherein the fixing shell is connected to the back shell to form a first cavity to contain the power component.

5. The UAV of claim 4, wherein the positioning unit comprises a front shell which is connected with a rim of the back shell to form a second cavity to contain the rotator, and wherein the rim extends from a side of the back shell away from the driving shaft and engages with an end region of the rotator.

6. The UAV of claim 4, wherein the front shell comprises a linking component in connection with the rim and a lid detachably connected to the linking component.

* * * * *